United States Patent

Jinks, Jr.

[11] Patent Number: 5,855,085
[45] Date of Patent: Jan. 5, 1999

[54] FISHING LINE SPOOL HOLDER

[76] Inventor: Robert C. Jinks, Jr., 102 1/2 E.F., Waurika, Okla. 73573

[21] Appl. No.: 10,507

[22] Filed: Jan. 22, 1998

[51] Int. Cl.$^6$ ............................. B65H 49/00; A01K 87/00
[52] U.S. Cl. ............................................ 43/20; 242/124.8
[58] Field of Search ................................. 43/4, 25, 25.2, 43/20; 242/597.7, 597.8, 404.1, 404.3, 129.8, DIG. 902

[56] References Cited

U.S. PATENT DOCUMENTS

| | | | |
|---|---|---|---|
| 3,951,354 | 4/1976 | Bagby | 242/129.8 |
| 5,029,409 | 7/1991 | Nouwens | 43/25 |
| 5,187,878 | 2/1993 | Kuttner | 43/25 |
| 5,237,769 | 8/1993 | Navarro | 43/25 |
| 5,375,788 | 12/1994 | English | 242/129.8 |

*Primary Examiner*—Thomas Price

[57] ABSTRACT

A new fishing line spool holder for mounting a spool of fishing line on a fishing rod to permit winding of the fishing line on to a fishing reel. The inventive device includes an elongate spool shaft having proximal and distal ends which is designed for inserting through the bore of a spool of fishing line to rotatably mount the spool on the spool shaft. Coupled to the proximal end of the spool shaft, is a flexible base. A mounting member is coupled to the flexible base. The mounting member has a mounting channel that extends between its ends for receiving the shaft of a fishing rod therein. An elongate flexible strap has a hole through which extends the spool shaft so that the flexible base is positioned adjacent the second surface of the flexible strap. On each of the surfaces of the flexible strap is a coupling portion positioned towards opposite ends of the flexible strap. The coupling portions are detachably couplable to one another when the elongate strap is wrapped around the outer surface of the mounting member so that the mounting member is held to the shaft of a fishing rod.

7 Claims, 2 Drawing Sheets

FISHING LINE SPOOL HOLDER

BACKGROUND OF THE INVENTION

1. Field of the Invention

The present invention relates to fishing line spool holders and more particularly pertains to a new fishing line spool holder for mounting a spool of fishing line on a fishing rod to permit winding of the fishing line on to a fishing reel.

2. Description of the Prior Art

The use of fishing line spool holders is known in the prior art. More specifically, fishing line spool holders heretofore devised and utilized are known to consist basically of familiar expected and obvious structural configurations, notwithstanding the myriad of designs encompassed by the crowded prior art which have been developed for the fulfillment of countless objectives and requirements.

Known prior art fishing line spool holders include U.S. Pat. No. 5,209,423; U.S. Pat. No. 4,360,172; U.S. Pat. No. Des. 280,124; U.S. Pat. No. 4,948,059; U.S. Pat. No. 5,322,236; and U.S. Pat. No. 4,953,810.

While these devices fulfill their respective, particular objectives and requirements, the aforementioned patents do not disclose a new fishing line spool holder. The inventive device includes an elongate spool shaft having proximal and distal ends which is designed for inserting through the bore of a spool of fishing line to rotatably mount the spool on the spool shaft. Coupled to the proximal end of the spool shaft, is a flexible base. A mounting member is coupled to the flexible base. The mounting member has a mounting channel that extends between its ends for receiving the shaft of a fishing rod therein. An elongate flexible strap has a hole through which extends the spool shaft so that the flexible base is positioned adjacent the second surface of the flexible strap. On each of the surfaces of the flexible strap is a coupling portion positioned towards opposite ends of the flexible strap. The coupling portions are detachably couplable to one another when the elongate strap is wrapped around the outer surface of the mounting member so that the mounting member is held to the shaft of a fishing rod.

In these respects, the fishing line spool holder according to the present invention substantially departs from the conventional concepts and designs of the prior art, and in so doing provides an apparatus primarily developed for the purpose of mounting a spool of fishing line on a fishing rod to permit winding of the fishing line on to a fishing reel.

SUMMARY OF THE INVENTION

In view of the foregoing disadvantages inherent in the known types of fishing line spool holders now present in the prior art, the present invention provides a new fishing line spool holder construction wherein the same can be utilized for mounting a spool of fishing line on a fishing rod to permit winding of the fishing line on to a fishing reel.

The general purpose of the present invention, which will be described subsequently in greater detail, is to provide a new fishing line spool holder apparatus and method which has many of the advantages of the fishing line spool holders mentioned heretofore and many novel features that result in a new fishing line spool holder which is not anticipated, rendered obvious, suggested, or even implied by any of the prior art fishing line spool holders, either alone or in any combination thereof.

To attain this, the present invention generally comprises an elongate spool shaft having proximal and distal ends which is designed for inserting through the bore of a spool of fishing line to rotatably mount the spool on the spool shaft. Coupled to the proximal end of the spool shaft, is a flexible base. A mounting member is coupled to the flexible base. The mounting member has a mounting channel that extends between its ends for receiving the shaft of a fishing rod therein. An elongate flexible strap has a hole through which extends the spool shaft so that the flexible base is positioned adjacent the second surface of the flexible strap. On each of the surfaces of the flexible strap is a coupling portion positioned towards opposite ends of the flexible strap. The coupling portions are detachably couplable to one another when the elongate strap is wrapped around the outer surface of the mounting member so that the mounting member is held to the shaft of a fishing rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application which is measured by the claims nor is it intended to be limiting as to the scope of the invention in any way.

It is therefore an object of the present invention to provide a new fishing line spool holder apparatus and method which has many of the advantages of the fishing line spool holders mentioned heretofore and many novel features that result in a new fishing line spool holder which is not anticipated, rendered obvious, suggested, or even implied by any of the prior art fishing line spool holders, either alone or in any combination thereof.

It is another object of the present invention to provide a new fishing line spool holder which may be easily and efficiently manufactured and marketed.

It is a further object of the present invention to provide a new fishing line spool holder which is of a durable and reliable construction.

An even further object of the present invention is to provide a new fishing line spool holder which is susceptible of a low cost of manufacture with regard to both materials and labor, and which accordingly is then susceptible of low prices of sale to the consuming public, thereby making such fishing line spool holder economically available to the buying public.

Still yet another object of the present invention is to provide a new fishing line spool holder which provides in the apparatuses and methods of the prior art some of the advantages thereof, while simultaneously overcoming some of the disadvantages normally associated therewith.

Still another object of the present invention is to provide a new fishing line spool holder for mounting a spool of fishing line on a fishing rod to permit winding of the fishing line on to a fishing reel.

Yet another object of the present invention is to provide a new fishing line spool holder which includes an elongate spool shaft having proximal and distal ends which is designed for inserting through the bore of a spool of fishing line to rotatably mount the spool on the spool shaft. Coupled to the proximal end of the spool shaft, is a flexible base. A mounting member is coupled to the flexible base. The mounting member has a mounting channel that extends between its ends for receiving the shaft of a fishing rod therein. An elongate flexible strap has a hole through which extends the spool shaft so that the flexible base is positioned adjacent the second surface of the flexible strap. On each of the surfaces of the flexible strap is a coupling portion positioned towards opposite ends of the flexible strap. The coupling portions are detachably couplable to one another when the elongate strap is wrapped around the outer surface of the mounting member so that the mounting member is held to the shaft of a fishing rod.

Still yet another object of the present invention is to provide a new fishing line spool holder that provides an easy and convenient "hands-free" method for winding fishing line onto a fishing reel.

Even still another object of the present invention is to provide a new fishing line spool holder that quickly and detachably mountable to a fishing rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
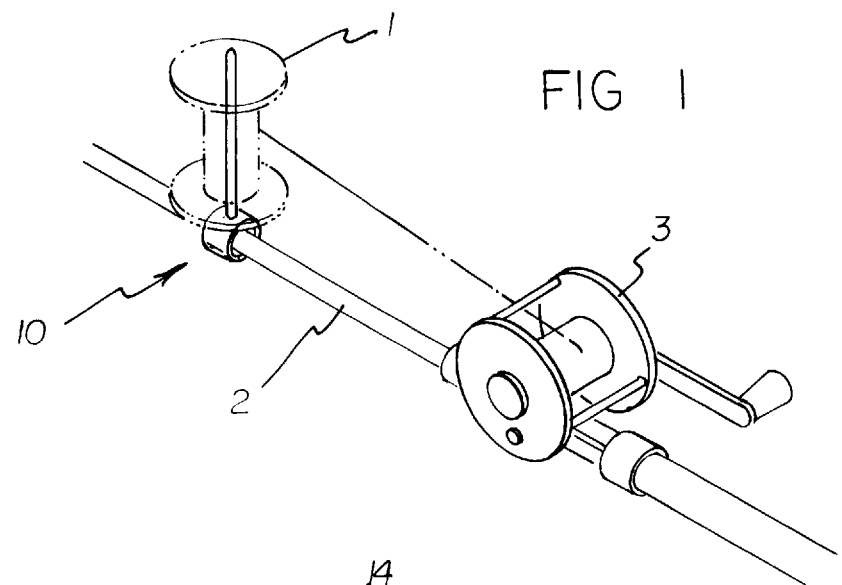
FIG. 1 is a schematic perspective view of a new fishing line spool holder in use loading a fishing reel with fishing line from a spool according to the present invention.

With reference now to the drawings, and in particular to FIGS. 1 through 4 thereof, a new fishing line spool holder embodying the principles and concepts of the present invention and generally designated by the reference numeral 10 will be described.

The fishing line spool holder 10 is designed for mounting a spool of fishing line 1 on an fishing rod 2 having a elongate shaft with a handle and a fishing reel 3. As best illustrated in FIGS. 1 through 4, the fishing line spool holder 10 generally comprises an elongate spool shaft 12 having proximal and distal ends 13,14 which is designed for inserting through the bore of a spool of fishing line 1 to rotatably mount the spool 1 on the spool shaft 12. Coupled to the proximal end 13 of the spool shaft 12, is a flexible base 16. A mounting member 18 is coupled to the flexible base 16. The mounting member 18 has a mounting channel 20 that extends between its ends for receiving the shaft of a fishing rod 2 therein. An elongate flexible strap 22 has a hole 27 through which extends the spool shaft 12 so that the flexible base is positioned adjacent the second surface 24 of the flexible strap 22. On each of the surfaces 23,24 of the flexible strap 22 is a coupling portion 28,29 positioned towards opposite ends 25,26 of the flexible strap 22. The coupling portions 28,29 are detachably couplable to one another when the elongate strap 22 is wrapped around the outer surface of the mounting member 18 so that the mounting member 18 is held to the shaft of a fishing rod 2.

Figure 3:
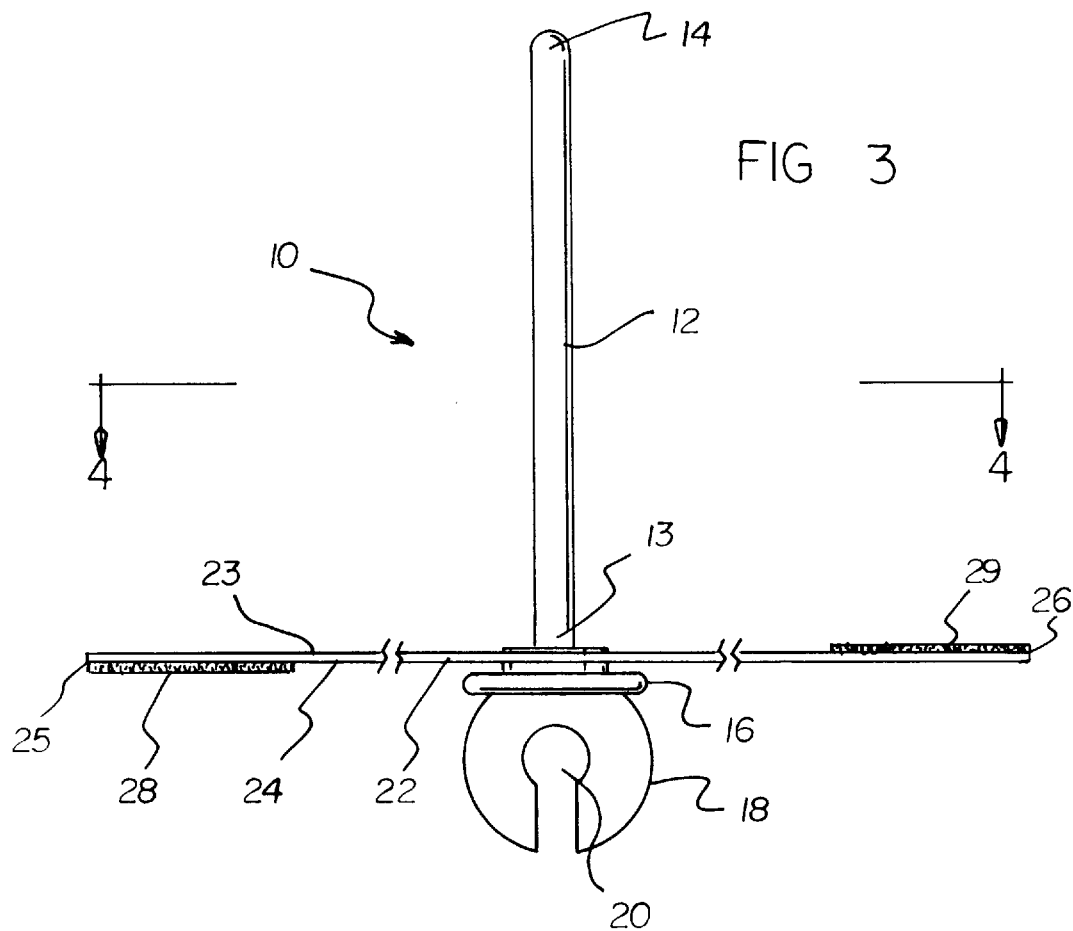
FIG. 3 is a schematic side view of the present invention.

As shown in FIG. 3, the mounting member 18 is preferably cylindrical with a pair of opposite circular ends. Even more preferably, the mounting channel 20 has a C-shaped cross section form to fit the shaft of a fishing rod 2 inserted into it. The mounting channel 20 is extended between the ends of the mounting member 18 so that the channel 20 is substantially parallel to the longitudinal axis of the mounting member 18. The outer surface of the mounting member 18 is coupled to the flexible base 16 preferably so that the spool shaft 12 is extended substantially perpendicular to the longitudinal axis of the mounting member 18 so that a spool of fishing line 1 mounted thereon may easily and freely rotate around the spool shaft 12.

Figure 2:
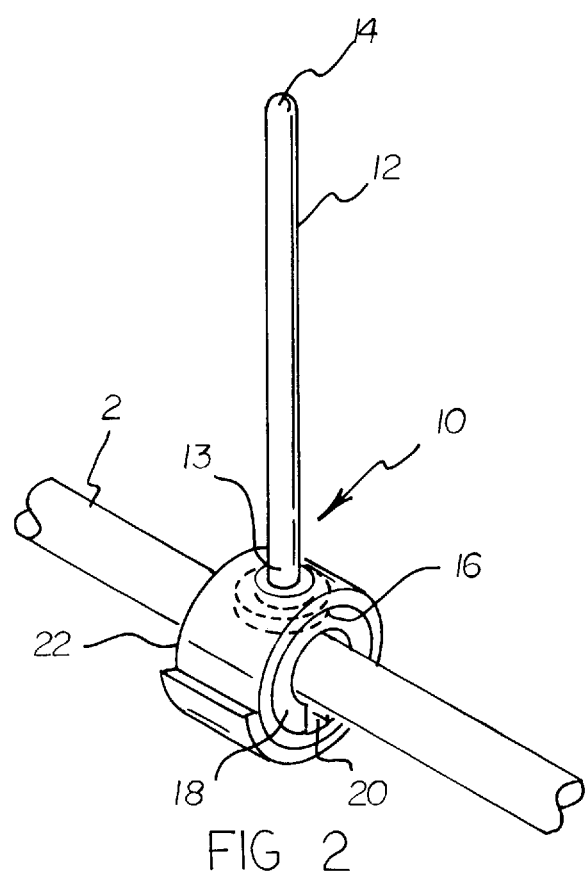
FIG. 2 is a schematic partial perspective view of the present invention mounted on a fishing rod.
Figure 4:
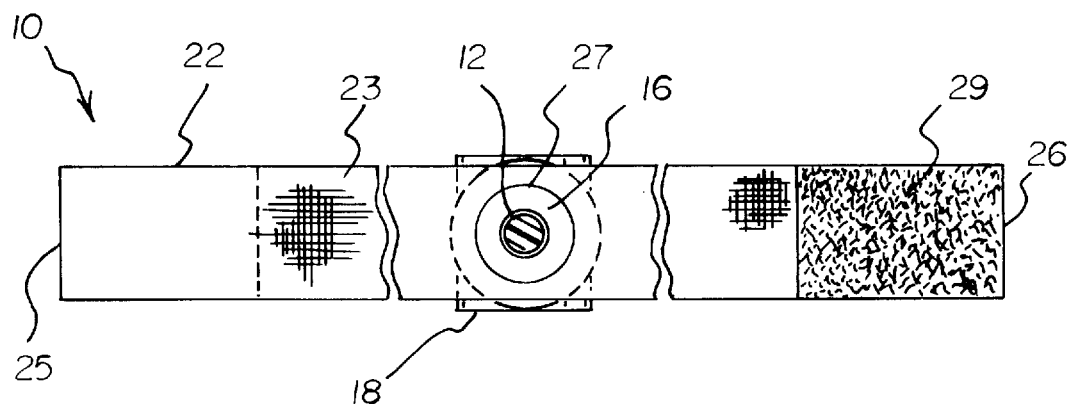
FIG. 4 is a schematic top side view of the present invention as seen from line 4—4 on FIG. 3.

With reference to FIG. 4, the hole 27 through the elongate flexible strap 22 is preferably positioned at a mid-point between the ends 25,26 of the flexible strap 2. The spool shaft 12 is extended through the hole 27 of the flexible strap 22 so that the flexible base 16 is positioned adjacent the second surface 24 of the flexible strap 22 and the distal end 14 of the spool shaft 12 is outwardly extended from the first surface 23 of the flexible strap 22. As shown in FIGS. 3 and 4, each of the surfaces 23,24 of the flexible strap 22 has a coupling portion 28,29 positioned at opposite ends of the flexible strap 22. The coupling portions 28,29 are constructed so that they are detachably couplable to one another. Ideally, each of the coupling portions has a complementary portion of a hook and loop fastener thereon for permitting detachable coupling of the coupling portions to one another. As shown in FIG. 2, the elongate strap 22 is wrappable around the outer surface of the mounting member 18 to hold the mounting member 18 to a shaft of a fishing rod 2 within the mounting channel 20 of the mounting member 18.

While the spool shaft may be constructed from any appropriate material, ideally, the spool shaft is made from a plastic. Also ideally, the base 16 is made from a rubber so that it is easily flexible to help fit around the mounting member 18 when the strap 22 is wrapped around it and the mounting member 18.

In use, as seen in FIGS. 1 and 2, the shaft of a fishing rod 2 is inserted into the mounting channel 20. A spool of fishing line 1 is then mounted on the spool shaft 12 so that the fishing line may be extended and attached to the fishing reel 3. The fishing line may then be wound on to the fishing reel 3 with the spool 1 freely spinning on the spool shaft 12. When the reel 3 is fully wound with fishing line, the line may be cut and the spool 1 removed from the spool shaft 12. The fishing line spool holder 10 may then be detached from the rod 2 by detaching the coupling portions 28,29 from one another and unwrapping the strap 22 from the rod 2.

As to a further discussion of the manner of usage and operation of the present inventions the same should be apparent from the above description. Accordingly, no further discussion relating to the manner of usage and operation will be provided.

With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing line spool holder for mounting a spool of fishing line on an fishing rod having a elongate shaft, said fishing line spool holder comprising:

an elongate spool shaft having proximal and distal end, said spool shaft being for inserting through the bore of a spool of fishing line to rotatably mount the spool to said spool shaft;

a flexible base being coupled to said proximal end of said spool shaft;

a mounting member having a longitudinal axis, an outer surface, a pair of opposite ends, and a mounting channel;

said mounting channel being for receiving a shaft of a fishing rod therein;

said outer surface of said mounting member being coupled to said flexible base;

an elongate flexible strap having first and second surfaces, a pair of opposite ends, and a hole being extended therethough;

said first and second surfaces of said flexible strap each having a coupling portion, said coupling portion of said first surface being positioned towards one of said ends of said flexible strap;

said coupling portion of said second surface being positioned towards the other of said ends of said flexible strap, said coupling portions being detachably couplable to one another;

said spool shaft being extended through said hole of said flexible strap, said flexible base being positioned adjacent said second surface of said flexible strap; and wherein said elongate strap is wrappable around said outer surface of said mounting member to hold said mounting member to a shaft of a fishing rod.

2. The fishing line spool holder of claim 1, wherein said base comprises rubber.

3. The fishing line spool holder of claim 1, wherein said mounting member is cylindrical.

4. The fishing line spool holder of claim 3, wherein said mounting channel is extended between said ends of said mounting member substantially parallel to said longitudinal axis of said mounting member.

5. The fishing line spool holder of claim 1, wherein said spool shaft is extended substantially perpendicular to said longitudinal axis of said mounting member.

6. The fishing line spool holder of claim 1, wherein said coupling portions each having a complementary portion of a hook and loop fastener thereon for permitting detachable coupling of said coupling portions to one another.

7. A fishing line spool holder for mounting a spool of fishing line on an fishing rod having a elongate shaft, said fishing line spool holder comprising:

an elongate spool shaft having proximal and distal ends, said spool shaft being for inserting through the bore of a spool of fishing line to rotatably mount the spool to said spool shaft;

a flexible base being coupled to said proximal end of said spool shaft, wherein said base comprises rubber;

a cylindrical mounting member having a longitudinal axis, an outer surface, a pair of opposite ends, and a mounting channel;

said mounting channel being extended between said ends of said mounting member substantially parallel to said longitudinal axis of said mounting member, said mounting channel being for receiving a shaft of a fishing rod therein;

said outer surface of said mounting member being coupled to said flexible base, said spool shaft being extended substantially perpendicular to said longitudinal axis of said mounting member;

an elongate flexible strap having first and second surfaces, a pair of opposite ends, and a hole being extended therethough;

said first and second surfaces each having a coupling portion, said coupling portion of said first surface being positioned towards one of said ends of said flexible strap;

said coupling portion of said second surface being positioned towards the other of said ends of said flexible strap, said coupling portions being detachably couplable to one another wherein said coupling portions each having a complementary portion of a hook and loop fastener thereon for permitting detachable coupling of said coupling portions to one another;

said spool shaft being extended through said hole of said flexible strap, said flexible base being positioned adjacent said second surface of said flexible strap; and wherein said elongate strap is wrappable around said outer surface of said mounting member to hold said mounting member to a shaft of a fishing rod.

* * * * *